Dec. 23, 1958
J. M. RHOADES
2,866,153
THREE-DIMENSION SERVOSYSTEM TRANSDUCER
Filed Nov. 19, 1957
2 Sheets-Sheet 1
FIG.1
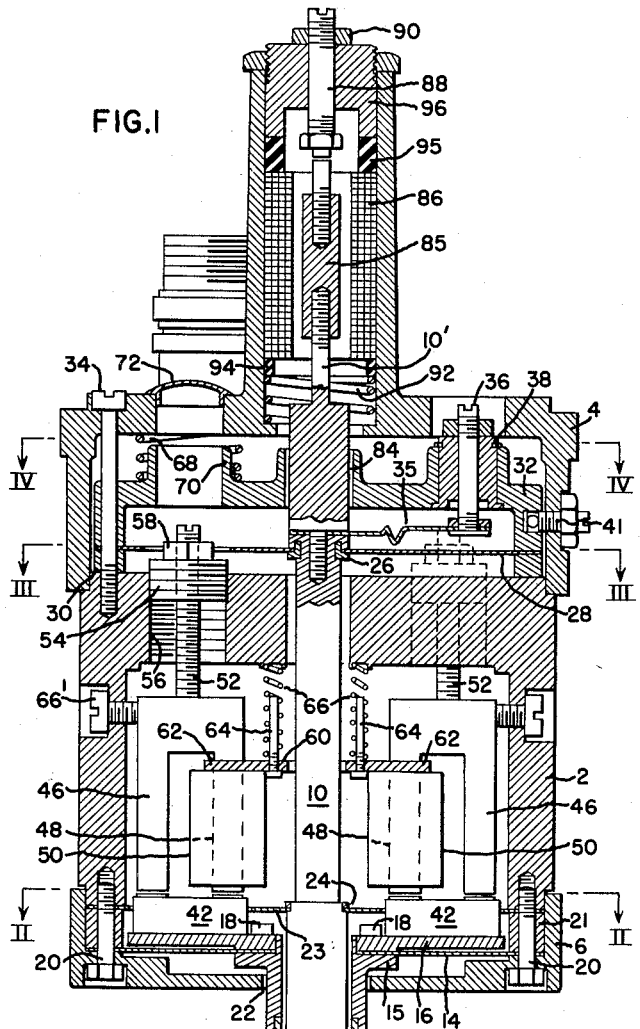
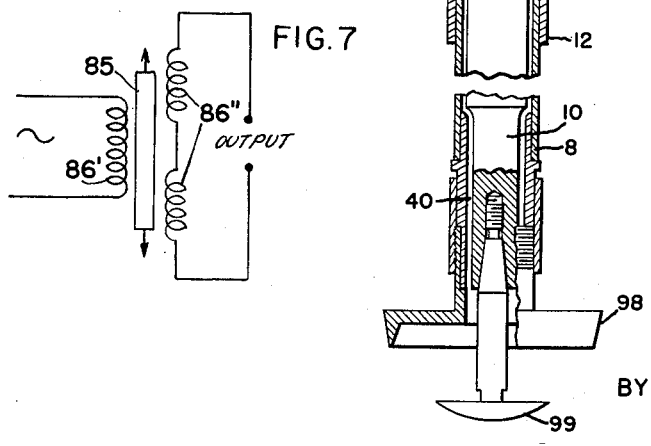
FIG.7
INVENTOR:
JOHN M. RHOADES,
BY *Melvin M. Goldenberg*
HIS ATTORNEY.

Dec. 23, 1958   J. M. RHOADES   2,866,153
THREE-DIMENSION SERVOSYSTEM TRANSDUCER
Filed Nov. 19, 1957   2 Sheets-Sheet 2

INVENTOR:
JOHN M. RHOADES,

BY *Melvin M. Goldenberg*
HIS ATTORNEY.

· # United States Patent Office

2,866,153
Patented Dec. 23, 1958

2,866,153

THREE-DIMENSION SERVOSYSTEM TRANSDUCER

John M. Rhoades, Waynesboro, Va., assignor to General Electric Company, a corporation of New York Application November 19, 1957, Serial No. 697,458

8 Claims. (Cl. 323—75)

This invention relates to devices for the reproduction of contours. More specifically, it relates to a novel device for the duplication of a shape existing in the form of a templet or templets by a material working tool including one or more forming elements.

An object of this invention is to provide a novel tracing head for following a templet or templets to control the motion of a material working tool in three dimensions in order to reproduce a contour embodied in the templet or templets.

Another object of this invention is the provision of a novel tracing head capable of developing control signals proportional to changes of contour being traced in three dimensions simultaneously or two or one dimensions at a time.

A further object of this invention is to provide novel electromagnetic apparatus capable of supplying electrical signals to control the motions of a material working tool in one, two or three dimensions at the selection of an operator.

A still further object of this invention is the provision of a novel electromagnetic sensing device capable of tracing a contour simultaneously in three axes with a high degree of accuracy.

Briefly, in one embodiment of my invention I provide a tracing head having two independent coextensive stylii. Deflection of one of the stylii will provide control signals in response to changes in contour in two dimensions while a deflection of the other stylus will provide control signals in response to changes of contour in a third dimension. Separate means are connected to each of the stylii to respond to the deflection of its respective stylus to develop the control signals proportional thereto.

The features of my invention which I believe to be novel are set forth with particularity in the appended claims. The invention itself, however, both as to its structure and method of operation together with further objects and advantages thereof may best be understood by reference to the following description taken in connection with the accompanying drawings wherein:

Fig. 1 is a cross sectional front view of an embodiment of my invention;

Fig. 7 is a schematic illustration of additional electrical circuitry embodied in my invention.

Figure 5:
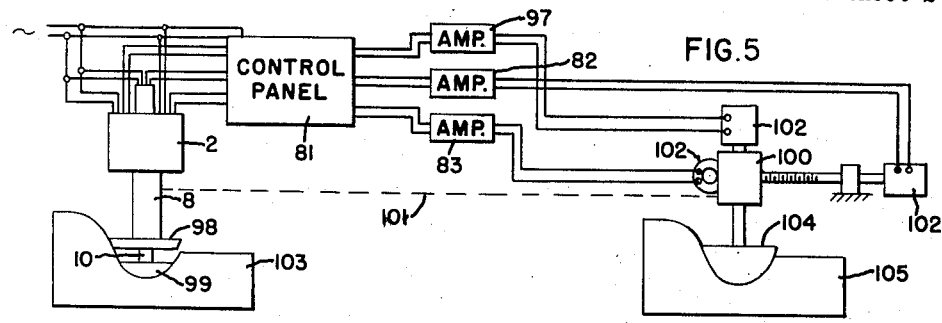
Fig. 5 is a schematic illustration of my invention incorporated in a contouring control system.
Figure 4:
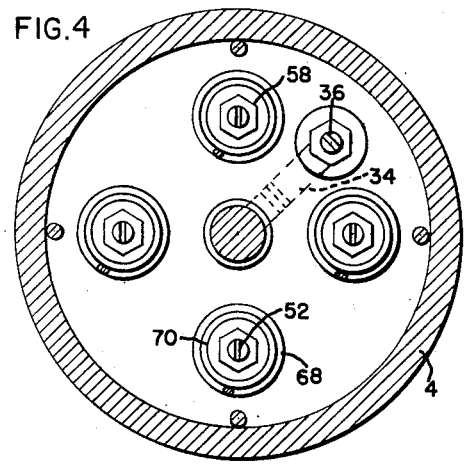
Fig. 4 is a sectional view along the line IV—IV of Fig. 1.
Figure 3:
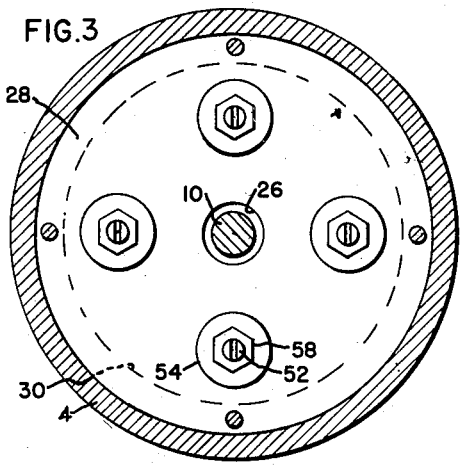
Fig. 3 is a sectional view along the line III—III of Fig. 1.

Referring to Fig. 1 of the drawing, the illustrated embodiment of my invention comprises a housing 2 provided with an upper cap 4 and a lower cap 6. Extending from the housing 2 is a hollow outer first stylus 8 which takes the form of a hollow member. Coextensive with the outer stylus 8 and of a lesser diameter than the inner diameter of the stylus 8 is an inner stylus 10 which is illustrated as a solid metallic rod. Means for mounting the outer stylus 8 on the tracing head are shown as constituting a sleeve 12 in which the outer stylus is secured as by a frictional grip and brazed joint and to which, in turn, is secured a resilient diaphragm 14 clamped between a flange 15 and an armature support plate 16 by threaded elements 18. The diaphragm is made of such a thickness as to resist vertical deflection by the outer stylus 8. The outer periphery of the diaphragm 14 is secured to the assembly by the threaded fasteners 20 engaging in the housing 2 and clamping it between the lower cap 6 and the lower surface of a spacing ring 21. An opening 22 in the lower cap 6 through which the sleeve 12 passes is of a greater diameter than the diameter of the sleeve to permit movement of the sleeve therein. Means for supporting the inner stylus 10 is illustrated as a lower diaphragm 23 engaging a shoulder thereof and being secured thereto by means of a frictional gripping collar 24. The outer periphery of the lower diaphragm 23 is secured between the spacing ring 21 and the housing 2 by means of the threaded fasteners 20. The upper end of the inner stylus 10 may be secured by a similar diaphragm means constituted by a collar 26 securing an upper diaphragm 28 to the inner stylus 10. The outer periphery of the upper diaphragm 28 is held between a spacing ring 30 resting between the upper end of the housing 2 and a flanged support 32 and held by means of a plurality of threaded fasteners 34 extending therethrough and secured in the housing 2. A spring 35 has one end secured to an adjusting screw 36 passing through a bushing 38 in the flanged support 32 and the other end secured to the inner stylus 10. The spring 35 exerts an axial force on the inner stylus 10 and by virtue of the adjusting screw 36 at its free end, adjustments of the inner stylus to a free or zero deflection position may be accurately made.

The outer stylus 8, by virtue of its connection with the diaphragm 14 senses deflections in the horizontal plane, i. e. in any direction perpendicular to the main axis of the tracing head and stylus. The lower diaphragm 32 and the upper diaphragm 28 permit the inner stylus 10 to move vertically along the longitudinal axis of the tracing head and stylii in response to upward forces on the stylus tip. The diaphragms 23 and 28 provide rigid horizontal support for the stylus tip to enable it to resist deflection by horizontal forces. Sufficient clearance as shown at 40 is provided between the two stylii to permit them to deflect independently without interference over a normal range of deflections. Set screws such as shown at 41 pass through the upper cap 4 and the flanged support 32 to permit horizontal adjustment of the inner stylus 10 to center it in the hollow stylus 8. Clearance for this purpose is provided between the flanged support 32 and threaded fasteners 34 and between the support 32 and upper cap 4.

Figure 2:
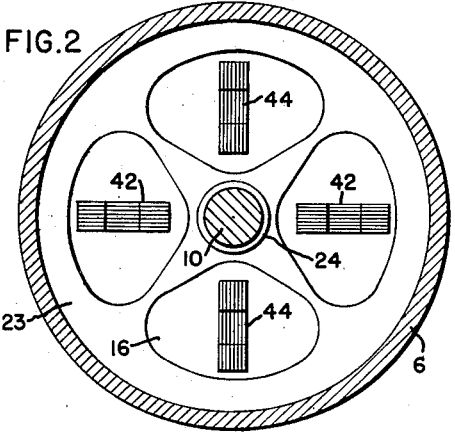
Fig. 2 is a sectional view along the line II—II of Fig. 1.

In this embodiment of the invention transducers such as electrical signal generating means are provided for developing control signals in response to the deflection of each of the stylii. As pointed out, since this stylus is capable of deflection in two dimensions, the signal means provided to be operated thereby must provide electrical signals proportional to the deflection in each of these dimensions at right angles to each other. The control signal developing means illustrated in the drawings comprises four armatures of magnetic material. As may be seen in Fig. 2, these armatures are disposed at 90° to each other so that the armatures 42 constitute a pair for sensing deflection in what may be termed the X direction and the armatures 44 constitute a pair of sensing deflection in what may be termed the Y direction. The armatures 42 and 44 are carried by the armature supporting plate 16 which, in turn, is rigidly attached to the upper end of the outer stylus 8. Magnetic cores are fixedly disposed above each of the armatures 42 and 44 and are provided with poles 46 and 48 to cooperate with corresponding portions on each armature. A coil 50 encompasses the leg 48 of each core and is excited from an alternating current source to develop control signals in response to changes in position of the armature. The position of the armature plate 16 establishes the air gaps for the coils 50. In the normal undeflected position of the stylus 8, all four air gaps are equal. If the stylus 8 is deflected to the right, as shown in the drawing, the right-hand side of the armature plate 16 rises, decreasing the air gap between the right-hand armature 42 and the poles right-hand poles 46 and 48. At the same time, the left-hand armature 42 falls, increasing the air gap between it and the poles left-hand poles 46 and 48. The result of the unbalance of the air gaps is to produce an electrical signal which is proportional thereto. A similar situation develops when the stylus 8 is deflected into and/or out of the plane of Fig. 1. Usually the stylus 8 will not be deflected exactly along one of the two directions considered unless tracing a templet surface parallel to the axis of a material working tool axis. It will, in general, be deflected in such a way that all four air gaps are changed and the changes will depend upon both the magnitude and the direction of the stylus deflection. Thus, two electrical signals are obtained from the two pairs of coils 50 and may be combined in a control system to provide control signals which are functions of the direction and magnitude of the stylus deflection. A control panel and system which will function to combine the electrical signals developed by the coils 50 in response to the deflection of the stylus 8 in two dimensions is disclosed in the patent to Branson No. 2,492,731, issued December 27, 1949, and assigned to the same assignee as this application.

In the illustrated embodiment, the cores 46 and 48 and coils 50 are retained in adjustable vertical positions by means of threaded elements 52 and axially adjustable in internally and externally threaded bushings 54 engaging in the threaded holes 56 in the top of the housing 2. Lock nuts 58 may be provided to retain the threaded elements in their proper adjusted positions. A retaining member 60 encompasses the stylus 10 and is provided with radially extending arms 62 encompassing the leg 48 of each core to hold them at right angles to each other. Vertically extending shafts provide guides for coil springs 66 which bear against the inner surface of the housing 2 to hold the retaining members against the coils 50. Set screws 68 are provided in the side of the housing 2 to lock magnetic cores and coils in their adjusted positions. The flanged support 32 is disposed within the upper cap 4 and rests on the spacing ring 30 with the outer periphery of the upper diaphragm 28 mounted therebetween. The flanged support 32 is retained in position by means of helical springs 68 engaging between the under surface of the upper cap 4 and encompassing bosses 70 on the flanged support 32. Removable caps 72 may be provided on the upper surface of the upper cap 4 for the purposes of adjusting and inspecting the mounting structure of the tracing head.

Figure 6:
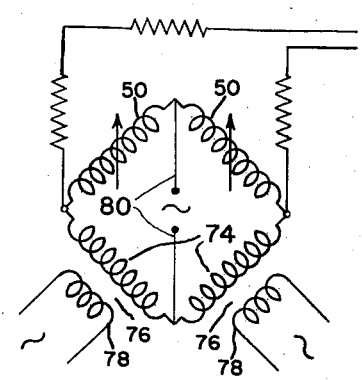
Fig. 6 is a schematic illustration of electrical circuitry embodied in my invention.

The electrical signals developed by the structure just described are, as pointed out, related in magnitude and phase to the deflection of the stylus 8 in two dimensions. In Fig. 6 of the drawing, the two coils 50 (in conjunction with the poles 46 and 48 and armatures 42 or 44) constitute variable inductance arms in an A. C. bridge circuit in which the secondaries 74 of a pair of transformers 76 constitute fixed inductance arms. The primaries 78 of the transformers 76 are excited from a suitable A. C. source. An output signal is derived via the conductors 80 which is combined with the output of the other similar bridge (wherein the variable inductance arms are at right angles mechanically) in a control panel 81 (see Fig. 5). The control panel may be similar to that shown in the patent to Branson No. 2,492,731 referred to above and after amplification by the amplifiers 82 and 83, may control the movement of a material working tool in two dimensions as disclosed in that patent.

In order to supply signals for controlling the material working tool in third or Z dimension, the upper end of the inner stylus 10 extends through an opening 84 in the flanged support 60 and is provided with an extension 10' on which an armature core 85 of a linear transducer is mounted as by the threaded means illustrated in the drawing. A winding 86 encompasses the core 84 and will develop electrical signals as will be described in greater detail hereinafter. A threaded element 88 is provided in the upper end of the tracing head and held in position by the nut 90 to adjustably limit the movement of the core 85. A coil spring 92 biases upwardly an insulating ring 94 to hold the winding 86 against an insulating ring 95 and a bushing 96 in the upper cap 4.

The operation of the device is characterized in the case of the one dimension or inner stylus 10 by a deflection of this stylus in response to its movement over a templet of changing contour. The signals for the one dimension portion of the system are supplied from the winding 86 which comprises an excitation winding 86' and two output windings 86'' with the movable armature 85 interposed therebetween to change the coupling in response to deflection of the inner stylus 10 (see Fig. 7). The output signal from this portion of the tracing head is a sine wave whose magnitude is dependent on the amount the stylus has been deflected on either side of a null position and is either in phase or out of phase with a reference voltage source. The output from a transducer of this character may be supplied to a discriminator in the control panel 81 (see Fig. 5) which compares the phase relationship of the reference voltage source and this output to develop a D. C. voltage whose polarity is an indication of whether or not the tracing head has been deflected past the null point and whose magnitude is a function of the magnitude of the stylus deflection from the null point. The D. C. voltage is supplied to amplifier 97 and used to control the material working tool in the Z dimension.

In the use of this apparatus, the outer stylus 8 may be provided with a tracing wheel 98 while the inner stylus 10 may be provided with a tracing tip 99 extending below the tracing wheel 98 if it is desired to reproduce a contour having changes in three dimensions in a coordinate system at right angles to each other. If desired, the shapes of the tracing wheel and tip may be similar to the shape of the cutting tool. In Fig. 5, it may be seen that the tracing head may be mechanically connected with the means 100 supporting the work forming member as shown schematically by the dotted line 101 to move concurrently therewith. Feed motor means 102 for each dimension are supplied with signals from the amplifiers 82, 83 and 87 in response to deflections of the stylii 8 and 10 due to changes in the contour of the templet 103. The cutting head 104 will thus shape the workpiece 105 to reproduce the conformation of the templet 103.

If desired, either the tracing wheel 98 or tip 99 may be removed so that the tracing head at the selection of the operator may trace in one, two or three dimensions.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States is:

1. A contour tracing device comprising a first stylus, a second stylus coextensive with said first stylus, means supporting said first stylus for deflection in two dimensions, means supporting said second stylus for deflection in a third dimension normal to said two dimensions, and control signal generating means responsive to the deflection of said stylii.

2. A contour tracing device comprising an elongated hollow stylus, a second elongated stylus extending into said hollow stylus and being of smaller dimension normal to its axis than the interior dimension of said first stylus, means supporting said hollow stylus for deflection in two dimensions, means supporting said second stylus for deflection in a third dimension normal to said two dimensions, and control signal generating means responsive to the deflection of said stylii.

3. A contour tracing device comprising a housing, an elongated hollow stylus extending from said housing, a second elongated stylus extending from said housing into said hollow stylus, diaphragm means engaging said hollow stylus and secured to said housing to permit deflection of said hollow stylus in two dimensions, diaphragm means engaging said second stylus and said housing to permit deflection of said second stylus in a dimension normal to said two dimensions and control signal generating means responsive to the deflection of said stylii.

4. A contour tracing device comprising a housing, an elongated hollow stylus extending from said housing, a second elongated stylus extending from said housing into said hollow stylus, diaphragm means engaging said hollow stylus and secured to said housing to permit deflection of said hollow stylus in two dimensions, a pair of spaced diaphragms engaging said second stylus and said housing to permit deflection of said second stylus in a dimension normal to said two dimensions and control signal generating means responsive to the deflection of said stylii.

5. A contour tracing device comprising a housing, an elongated hollow stylus extending from said housing, a second elongated stylus extending from said housing into said hollow stylus, diaphragm means engaging said hollow stylus and secured to said housing to permit deflection of said hollow stylus in two dimensions, a pair of spaced diaphragms engaging said second stylus and said housing to permit deflection of said second stylus in a dimension normal to said two dimensions, means supporting one of said spaced diaphragms in said housing for movement normal to the longitudinal axis of said second stylus and control signal generating means responsive to the deflection of said stylii.

6. A contour tracing device comprising a housing, a first elongated stylus extending from said housing, means supporting said first stylus in said housing and substantially constraining its longitudinal movement, a second elongated stylus extending parallel to said first stylus, means supporting said second stylus in said housing and constraining its axial movement, a plurality of electrical transducers mounted in said housing in spaced relationship to each other, said transducers including fixed movable elements, means connecting said movable elements to said first stylus whereby electrical signals proportional to its displacement are developed, a linear transducer including a fixed and a movable element mounted in said housing and means connecting said movable element of said linear transducer to said second stylus whereby an electrical signal proportional to its displacement is developed.

7. A contour tracing device comprising a housing, a first elongated stylus extending from said housing, means supporting said first stylus in said housing and substantially constraining its longitudinal movement, a second elongated stylus extending parallel to said first stylus, means supporting said second stylus in said housing and constraining its axial movement, a plurality of electrical transducers mounted in said housing at right angles to each other, each of said transducers including a core of magnetic material having a coil wound thereon and a movable armature, means connecting said movable armatures to said first stylus, a linear transducer having a fixed element and a movable element, and means connecting said movable element to said second stylus.

8. A contour tracing device comprising a housing, an elongated hollow stylus extending from said housing, a second elongated stylus extending from said housing into said hollow stylus, diaphragm means engaging said hollow stylus and secured to said housing to permit deflection of said hollow stylus in two dimensions, a pair of spaced diaphragm engaging said second stylus and said housing to permit deflection of said second stylus in a dimension normal to said two dimensions, a plurality of electrical transducers mounted in said housing at right angles to each other, each of said transducers including a core of magnetic material having a coil wound thereon and a movable armature, means connecting said movable armatures to said first stylus, a linear transducer having a fixed element and a movable element, and means connecting said movable element to said second stylus.

References Cited in the file of this patent
UNITED STATES PATENTS
2,492,731   Branson _____ Dec. 27, 1949